United States Patent [19]

Hormel

[11] Patent Number: 4,800,915
[45] Date of Patent: Jan. 31, 1989

[54] BUTTERFLY VALVE

[75] Inventor: Herbert L. Hormel, Oakdale, Pa.

[73] Assignee: S. P. Kinney Engineers, Inc., Carnegie, Pa.

[21] Appl. No.: 85,881

[22] Filed: Aug. 14, 1987

[51] Int. Cl.[4] .................... F16K 49/00; F16K 1/22
[52] U.S. Cl. .................... 137/340; 251/306; 251/308
[58] Field of Search ............ 137/340; 251/305, 308, 251/306

[56] References Cited

U.S. PATENT DOCUMENTS

| 1,656,183 | 1/1928 | Enz . | |
|---|---|---|---|
| 1,904,467 | 4/1933 | Karnath . | |
| 2,073,481 | 3/1937 | Kinzie | 137/340 |
| 2,331,465 | 10/1943 | Fox | 137/340 |
| 2,517,596 | 8/1950 | Parducci | 251/12 |
| 2,811,981 | 11/1957 | Harris | 137/340 |
| 3,343,805 | 9/1967 | Felton | 251/306 |
| 3,487,849 | 1/1970 | Vietorisz | 137/340 |
| 3,499,462 | 3/1970 | Berczynski | 137/340 |
| 3,557,823 | 1/1971 | Carr | 137/340 |
| 4,294,283 | 10/1981 | Scharres | 137/601 |
| 4,380,246 | 4/1983 | Casale et al. | 137/375 |
| 4,542,763 | 9/1985 | Gardner et al. | 137/340 |
| 4,559,967 | 12/1985 | Gardner et al. | 137/340 |

FOREIGN PATENT DOCUMENTS 1145919  6/1966  United Kingdom ............ 137/340

Primary Examiner—A. Michael Chambers
Attorney, Agent, or Firm—Parmelee, Miller, Welsh & Kratz

[57] ABSTRACT

A butterfly valve for controlling the flow of high temperature fluids, particularly hot gases, comprises a fluid cooled disc, fluid cooled shafts and a fluid cooled body. The coolant fluid is preferably water. The disc includes a plurality of baffle strips positioned within a hollow interior defining a continuous, serpentine-like coolant flow passageway across the disc for uniform cooling thereof. An outer peripheral edge of the disc carries a resilient high-temperature sealing strip, preferably of a braided Inconel material, for improved gas sealing. The shafts which rotatably mount the disc within the body are hollow and are also cooled by the coolant fluid which is supplied to the disc. The valve body includes a fluid cooling jacket formed adjacent an inner sidewall which forms a seal with the disc along a circumferential surface portion thereof.

16 Claims, 6 Drawing Sheets

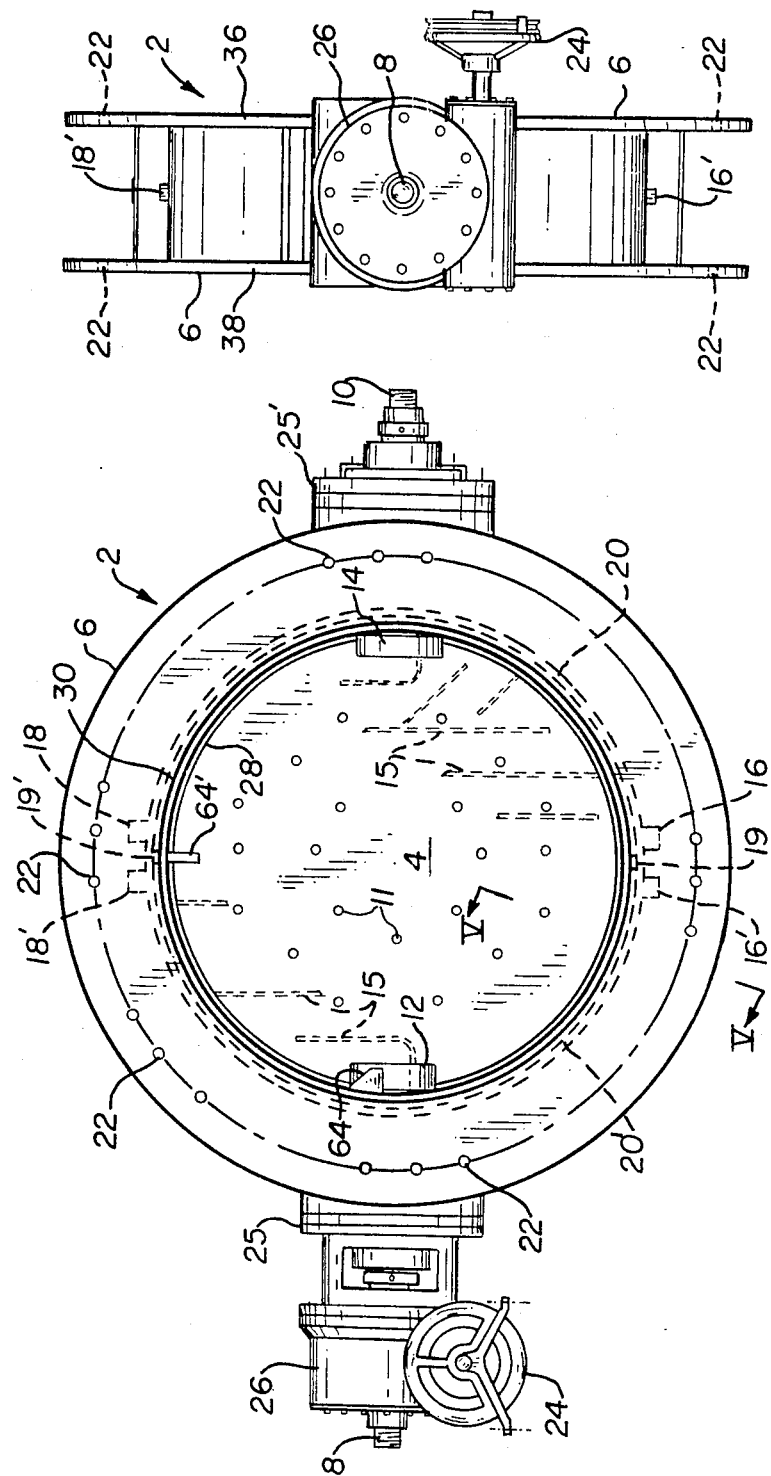

BUTTERFLY VALVE

BACKGROUND OF THE INVENTION

The present invention relates generally to fluid control valves and, more particularly, to butterfly valves for controlling the flow of high temperature gases, such as, for example, hot gases downstream from an electric steel making furnace. The butterfly valve of the present invention is particularly suited for use in the main gas duct on the outlet side of a gas preheater for diversion of hot gas flow to a stack or to an air cleaner means or vice versa. The hot gas conduit or "main", as it is sometimes called, is relatively large in steel making operations, generally on the order of about 4 feet in diameter. In such applications, the usual service temperature facing the flow control valve is about 700° to 800° F., with excursions of upwards of 1000°–1500° F. or higher possible. It is observed that steel components may become plastic at such high temperatures. When such temperature excursions occur, harmful deformation and subsequent valve failure oftentimes result.

Some prior attempts have been made to provide a partially water-cooled butterfly valve wherein coolant water is introduced to the rotatable disc portion of the valve at one side thereof and withdrawn at an opposite side. Such valves have not proven to be totally satisfactory. Exemplary of prior fluid cooled butterfly valves are the devices disclosed in U.S. Pat. Nos. 2,517,596 and 2,811,981 to Parducci and Harris, respectively. The flow pattern of coolant water across the disc is non-uniform in these prior devices, resulting in low-flow rates or the formation of actual stagnant areas in the outer regions of the disc. Such flow irregularities cause localized hot spots to form on the disc surfaces. Deformation and poor sealing results, if not total disc failure when coolant flow irregularities occur. Further, prior butterfly valves have failed to provide adequate combined disc and body cooling which is needed to prevent deformation along the sealing surfaces of the valve disc and body.

The present invention solves many of the problems heretofore encountered in large diameter, high temperature applications by providing a butterfly valve in which the rotatable disc, the mounting shafts and the stationary body are all internally cooled by a fluid such as water. The valve disc is provided with a plurality of internal baffles to provide a tortuous yet uniform flow pathway for the cooling fluid and achieve uniform cooling across all surfaces of the disc. Localized water stagnation and hot spots on the disc surfaces are eliminated in the valve of the present invention. High coolant fluid flow rates prevent scale formation and attendant decreased heat exchange efficiency problems common in prior devices. The present invention further provides a butterfly valve which includes an improved gas seal means along the outer perimeter of the disc to achieve improved sealing efficiencies of upwards of 98% and higher. The invention further includes a hollow disc having a high strength construction which provides increased safety in the unlikely event cooling liquid should become trapped within the disc. The high strength disc is provided with reinforcement to contain internal steam pressure so generated. The butterfly valve of the present invention still further includes fluid cooled shafts to support the rotatable fluid cooled disc to provide correspondingly high flow rates of coolant fluid and a unique gas/fluid sealing arrangement in the shaft/hub assemblies.

The butterfly valve of the present invention further provides a valve body having a fluid cooling jacket adjacent an inner sidewall sealing surface to provide an improved gas seal. The body cooling jacket also provides a back-up cooling system in the event of blockage or failure in the disc cooling system so as to prolong the life and sealing capabilities of the valve assembly In addition, the cooling jacket construction of the valve body is of a double wall configuration which provides a body structure having greater strength than that of the main gas conduit. The increased structural strength and rigidity of the body provided by the double wall cooling jacket construction eliminates the need for auxiliary support posts or other support structures as commonly required in large conventional valve bodies.

Still further, the present invention provides a butterfly valve having improved coolant flow rates at the restricted hub areas of the valve body to ensure uniform fluid flow and cooling around the periphery of the body. The gas seal area of the valve body also provides a seat area constructed of a higher hardness metal which resists wear caused by abrasive particulate materials which may be carried in the gas stream. Since wear of the sealing seat is resisted, a uniform sealing interface is maintained along the periphery of the valve disc to ensure minimum gas leakage and correspondingly high sealing efficiencies. A sealing strip of high temperature braided Inconel material around the disc provides high abrasion resistance and offers superior resilience to ensure long term sealing efficiency.

SUMMARY OF THE INVENTION

These above features and other advantages are provided by the novel butterfly valve of the present invention. Briefly stated, the invention provides a fluid cooled butterfly valve which is particularly suited for use in a high temperature gas conduit, main, pipe or the like. The butterfly valve includes a disc comprising a pair of spaced-apart disc plates which define an open interior therebetween. A peripheral edge plate joins the disc plates and a portion thereof defines a first valve sealing surface around the disc. Baffle means preferably in the form of a plurality of stainless steel strips, are positioned in a parallel, alternatingly off-set array within the interior of the disc to define a tortuous and continuous fluid cooling pathway across the disc from a fluid inlet end to an outlet end thereof. The disc also includes an inlet hub communicating with the inlet end of the baffle means and a diametrically disposed outlet hub which communicates with the outlet end of the baffle means. Fluid inlet and outlet shafts communicate, respectively, with the inlet and outlet hubs and permit the flow of cooling fluid therein. The cooling fluid is preferably water. The butterfly valve further includes a valve body having a main fluid flow passage therein which is adapted to be fitted to a hot gas main to permit the flow of furnace gases or like hot gases therethrough. The valve body includes means for mounting the disc therein to permit rotative movement of the disc from an open position to a closed position within the body. The body has a second valve sealing surface adapted to engage the first valve sealing surface of the disc when the disc is in a closed position The body also includes heat exchange means in the form of a cooling jacket defined by a fluid cooling passageway located adjacent the second sealing surface having fluid inlet and outlet passageways communicating therewith. Restricted water flow areas of the cooling jacket which occur adjacent the hubs are alleviated by providing pairs of bypass orifices and hoses to permit a substantial volume of cooling fluid to continuously bypass the hub areas so as to maintain high flow rates around the body cooling jacket. The cooling fluid used in the valve body is also preferably water.

The valve disc preferably carries a flexible and resilient sealing element around the peripheral edge portion thereof which forms the first valve sealing surface. The flexible sealing element is preferably a braided Inconel alloy metal material which is capable of withstanding elevated temperatures while retaining excellent memory or long term resiliency. The peripheral edge portion of the disc has a diamond-shaped groove formed therein and the braided metal sealing strip is press-fitted into the groove such that an edge portion of the braided strip is permitted to protrude beyond the peripheral edge of the disc. The protruding edge portion of the braided strip forms the sealing surface.

The valve body comprises a first generally flat body plate and a second spaced-apart flat body plate. Each body plate has a central aperture formed therethrough of a diameter substantially equal to that of the main gas conduit to be fitted. A ring-shaped inner sidewall plate is attached to the first and second body plates around the central apertures therein. A ring-shaped outer sidewall plate is also fitted between said first and second body plates to form a fluid cooling jacket in the space between the inner and outer sidewall plates. The double wall construction of the cooling jacket not only provides a heat exchange means but also significantly increases the structural rigidity of the body. A raised seating area is formed on the inside diameter of the cooled inner sidewall plate which defines a second valve sealing surface. This raised seating area may be formed of an abrasion resistant weld material and ground to fit evenly against the first valve sealing surface formed by the braided Inconel sealing strip of the disc.

BRIEF DESCRIPTION OF THE DRAWINGS

The above features and advantages of the present invention will become more readily apparent from the following detailed description when taken along with the accompanying drawings, in which:

FIG. 1 is a front elevational view of a presently preferred embodiment of a butterfly valve of the present invention;

FIG. 2 is a side elevational view of the valve of FIG. 1;

DETAILED DESCRIPTION OF THE INVENTION

Figure 3:
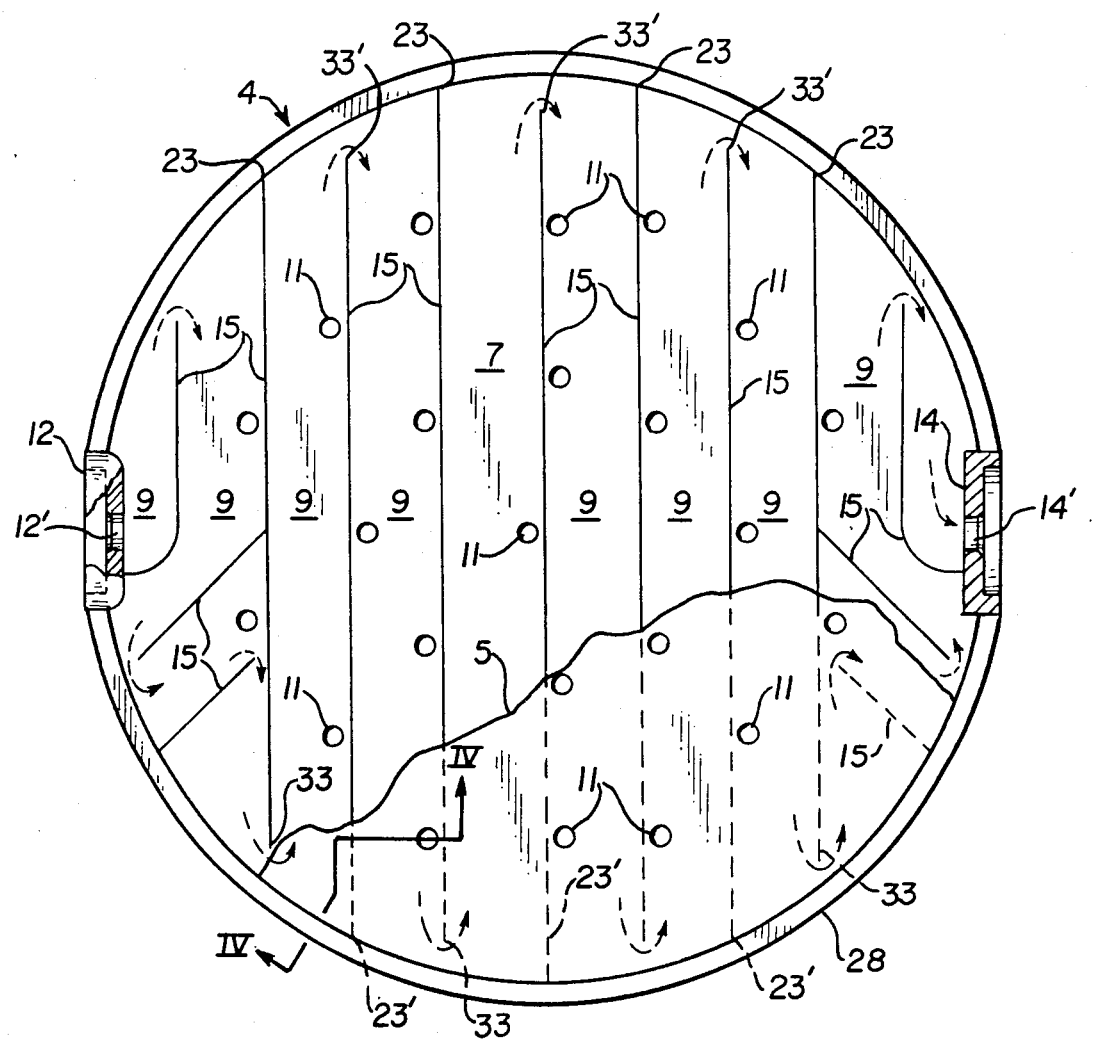
FIG. 3 is a partial, fragmentary front elevational view of the disc element of the valve of FIG. 1.

Referring now to the drawings, wherein the same elements are identified in the various drawing figures by identical reference numerals, a presently preferred embodiment of the butterfly valve of the present invention is identified generally by the reference numeral 2 in FIGS. 1 and 2. The butterfly valve 2 is particularly suited for use in controlling the flow of high temperature fluids, particularly hot gases, at elevated temperatures, on the order of 500° F. to 1500° F. and higher. The butterfly valve 2 comprises a circular disc 4 which is pivotally mounted at diametrically opposed hub portions 12 and 14 for controlled rotative movement in a valve body 6. The body 6 carries appropriate bolt holes 22 around its periphery which are adapted to be fitted to conventional flanges carried by a high temperature fluid duct, conduit, or main, such as, for example, the main from a hot gas preheater in an electric furnace steel making process. A conventional valve operator assembly 26 having a manual chain wheel 24 is employed to rotate the disc 4 within the body 6 to control the flow of hot gases through the main or conduit and to effectively seal-off the gas flow when the disc 4 is in a closed position as indicated in FIG. 1. Both the disc 4 and a sealing seat area 30 of the body 6 are provided with internal fluid passageways to permit the continuous flow of a fluid coolant, preferably water, therethrough. This total cooling of all hot components of the valve permits the use of relatively inexpensive fabricated mild steel plate components in the manufacture of the disc and body. The details of construction of these elements will be described in greater detail hereinafter.

The fluid cooled disc 4 of the present invention includes a pair of spaced-apart circular plates, comprising a first disc plate 5 and a second disc plate 7. The disc plates 5 and 7 define a spaced region therebetween for a plurality of fluid passages 9 therein, FIGS. 3–4. The spacing between the first disc plate 5 and second disc plate 7 is maintained by a plurality of stay bolts or pins 11 which pass through vertically aligned holes formed in the disc plates and held in place by weld beads 13, FIG. 4. The stay bolts 11 not only serve to maintain the spacing between the plates 5 and 7 but also function o structurally strengthen the plates. In the unlikely event that an outlet coolant line should ever become plugged or otherwise malfunction, the high gas temperatures in the main may cause stagnated water within the passages 9 to boil and convert to high pressure steam. The stay bolts 11 function to strengthen the disc plates 5 and 7 so as to contain steam pressure therewithin.

Figure 4:
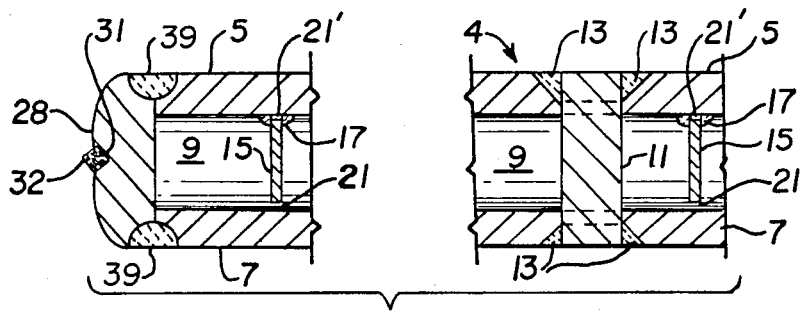
FIG. 4 is an enlarged, partial fragmentary cross-sectional view of the disc taken along line IV—IV of FIG. 3.

The outer edges of the disc plates 5 and 7 are joined by a peripheral edge plate 28 which is weldably secured by weld beads 39 along the respective edges of the plates 5 and 7, FIG. 4. A portion of the peripheral edge plate 28 defines a first valve sealing area. Plate 28 preferably contains a diamond-shaped groove 31 formed therearound. A braided metal strip 32, preferably of Inconel alloy, is fitted within the groove 31 and is retained thereby in such a manner that one corner of the metal strip 32 protrudes beyond the surface of the peripheral edge plate 28. The protruding edge of the braided strip 32 forms the first valve sealing surface. The braided Inconel strip 32 is capable of withstanding relatively high service temperatures, on the order of 2000° F. or higher. The resilient braided Inconel material has a good memory and superior abrasion resistance qualities to form a substantially gas tight seal within the valve 2.

The interior of the disc 4 between the plates 5 and 7 is fitted with a plurality of baffle elements 15, preferably formed of stainless steel strips. In the presently preferred embodiment of the butterfly valve 2 depicted in the drawings, the disc element 4 is approximately 4 feet in diameter. The interior spacing between the first disc plate 5 and the second disc plate 7 is about 1¼ inches. As seen in FIG. 4, the baffle strips 15, when viewed along an edge portion, are perpendicularly aligned with respect to the planes of the disc plates 5 and 7. The baffle strips possess a height dimension slightly less than the internal spacing between the disc plates 5 and 7 such that small spacing gaps 21' and 21, on the order of about 0.010 inches, are formed between the respective edges of the strips 15 and the inside surfaces of the plates 5 and 7. The gaps 21 and 21' permit a small amount of cooling fluid to short circuit from the main flow paths 9 and travel beneath edge portions of the baffle strips 15 facing the plates 5 and 7. The function and purpose of these gaps will be explained in greater detail hereinafter.

Figure 6:
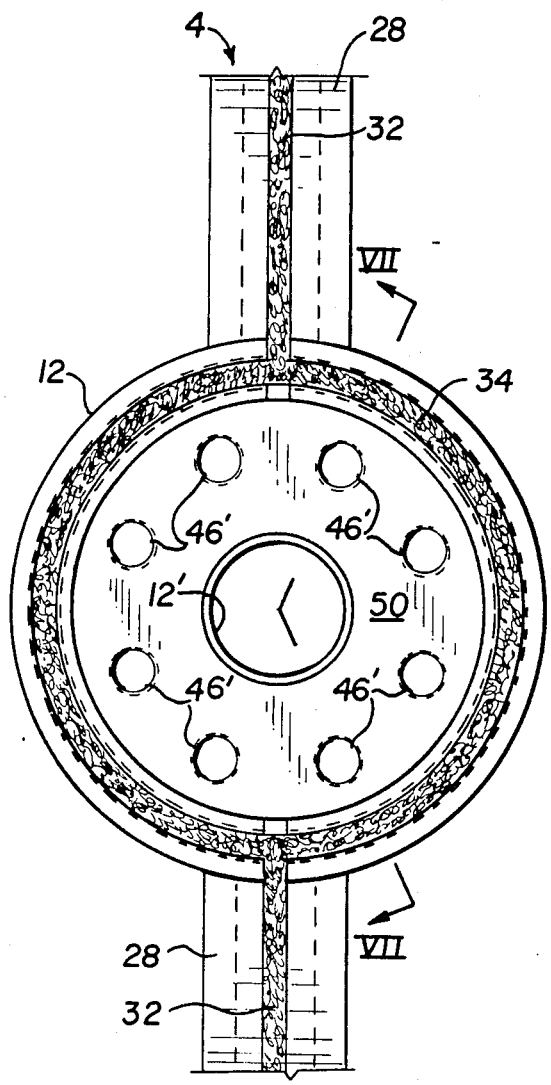
FIG. 6 is an enlarged partial, fragmentary side elevational view of a disc and hub.
Figure 7:
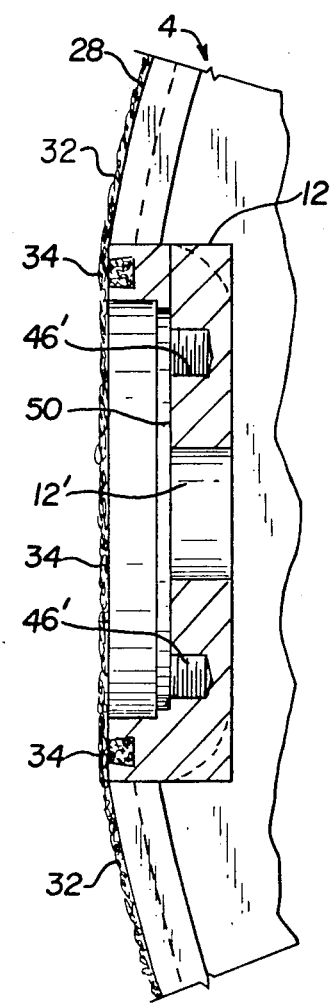
FIG. 7 is a partial, fragmentary cross-sectional view of the hub and disc taken along line VII—VII of FIG. 6.

The disc 4 includes an inlet hub 12 and an outlet hub 14 weldably secured thereto at diametrically opposed portions on the periphery thereof. As best seen in FIGS. 3, 6 and 7, the hubs 12 and 14 are cup-shaped and each have a central orifice 12' and 14', respectively, formed therethrough to permit the flow of cooling fluid therethrough. As seen in FIG. 3, the cooling fluid, such as water, enters the disc 4 at hub 12 and flows through the inlet orifice 12' thereof. The majority of the baffle strips 15 are arranged substantially in a spaced-apart, parallel array having respective alternating end portions 23 and 23' terminating at the peripheral edge plate 28 and alternating end portions 33 and 33' spaced from the edge plate 28. In this manner, the cooling fluid flows in a tortuous, yet continuous, serpentine-like flow path across the entire width and breadth of the disc 4 to ensure that all of the surfaces of the disc plates 5 and 7 are subject to a continuous flow of cooling fluid. Such continuous flow not only prevents the coolant fluid from overheating or boiling, but also provides a scouring action along the flow passages 9 of the disc so as to prevent scale build-up therein which could otherwise slow the flow of coolant fluid and/or decrease the coefficent of thermal conductivity of the disc plates. The baffle strips 15 which define the generally uniformly spaced-apart coolant flow passages 9 are tack welded at 17 to only one of the disc plates, such as plate 5, as shown in FIG. 4. As previously explained, this arrangement provides small gaps 21' and 21 at the top and bottom edges of the baffle strips 15. The bead of each tack weld 17 is preferably about 1-1½ inches long and spaced approximately four inches apart throughout the length of the strips 15. The gaps 21 and 21' between the edges of the baffle strips 15 and the disc plates 5 and 7, on the order of 0.010 inches, permit a small amount of short circuit water flow therebetween which prevents the formation of localized hot spots beneath the plate areas facing the edges of baffle strips 15. It is further noted that the short circuit gaps 21 and 21' prevent the formation of stagnated air pockets within the interior of the disc which also tend to create objectionable hot spots which may eventually lead to thermal distortion on the sealing surface of the disc 4. The baffle strips 15 within the disc 4 are spaced apart about 4½ inches to define the fluid passageways 9 therebetween. The spacing between the ends 33 and 33' of the baffle strips 15 and the interior periphery of the disc edge plate 28 is approximately 2 inches so as to provide an unrestricted pathway and a relatively high velocity flow of coolant through the passageways 9. A flow on the order of about 2-5 feet per second within the disc 4 is preferably achieved to provide an excellent heat exchange and a continuous and thorough scouring action within the interior of the disc passageways 9.

The disc 4 of the butterfly valve 2 is mounted for rotation within the central aperture of the valve body 6 by way of hollow inlet and outlet shafts 8 and 10 which are mounted within bearing assemblies 25 and 25', respectively, FIG. 1. The shafts 8 and 10 have internal bores which communicate with the inlet and outlet bores 12' and 14' of the disc hubs 12 and 14, respectively, to permit the introduction and withdrawal of coolant fluid to the interior of the disc. Standard inplant water is preferably supplied to the inlet shaft 8 by way of a flexible hose (not shown). A similar flexible hose is attached to the end of outlet shaft 10 to recycle the water within the plant system. Generally, the cooling water requirements for the invention are relatively low, on the order of 15-20 gallons per minute with negligible temperature rise being noted between the disc inlet and outlet streams. As pointed out below, this suggests that the outlet water, from the disc 4 may be cycled directly to cool the body 6.

Figure 8:
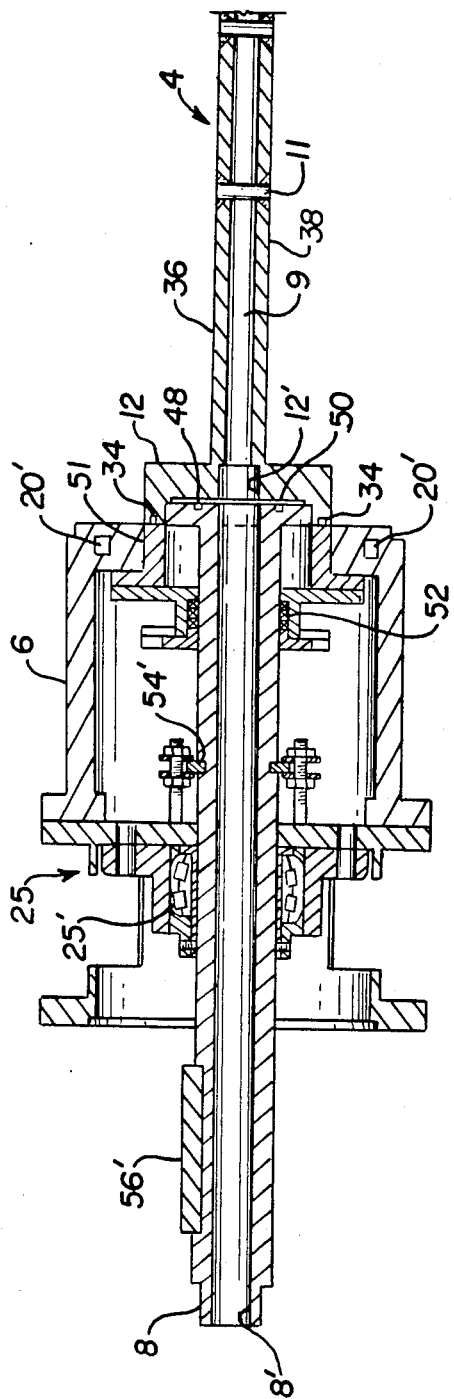
FIG. 8 is an enlarged, partial, fragmentary cross-sectional view of the disc, hub, and bearing assembly.
Figure 10:
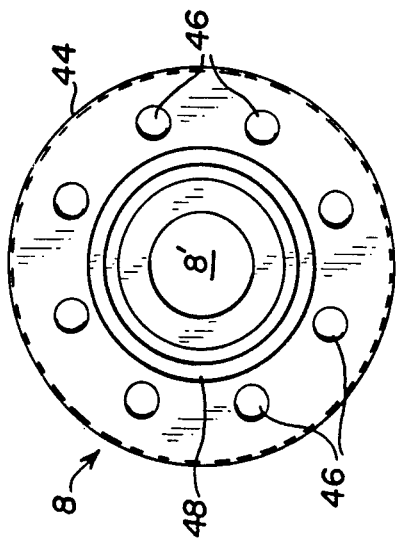
FIG. 10 is an enlarged, end view of the shaft flange of FIG. 9.
Figure 9:
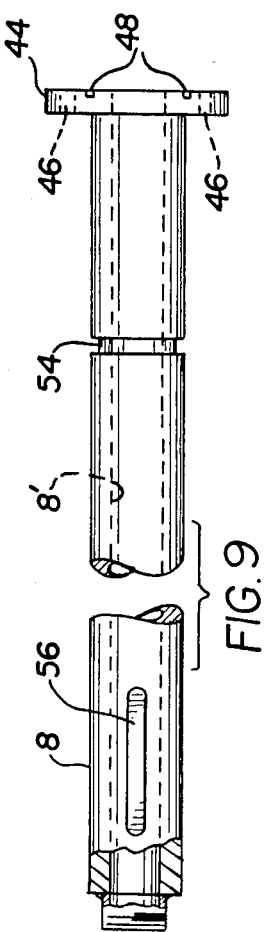
FIG. 9 is a fragmentary side elevational view of a disc shaft.

The hollow shafts 8 and 10 are rotatably supported in a similar manner at diametrically opposed portions of the valve body 6. A description of the mounting support for inlet shaft 8, depicted in FIGS. 8-9, is deemed sufficient for an understanding of the similar mounting structure for shaft 10. The rotatable shaft 8 contains a hollow bore 8' which communicates with the orifice 12' of the inlet hub 12. The shaft 8 carries a flanged end 44 having a plurality of spaced-apart bolt holes 46 formed therein which are adapted to be boltably secured to aligned, threaded bolt holes 46' formed in the hub 12, FIGS. 6-10. The flange 44 also has a circular groove formed therein for the placement of an 0-ring seal 48 of Neoprene or like rubber material therein. As seen in FIG. 8, the 0-ring 48 bears against a flat surface 50 of the cupped-shaped hub 12 to prevent cooling fluid leakage therebetween. Since the cooling fluid passing through the bore 8' is in contact with the 0-ring 48, it is possible to use a lower temperature material, such as Neoprene, to achieve superior liquid sealing properties, without the danger of material degradation or melting. As seen in FIG. 8, the disc shaft 8 passes through the valve body 6 and is rotatably supported therein by a packing gland assembly 52 and bearing assembly 25'. The shaft 8 also has a grooved portion 54, seen in FIG. 9, which is engaged by a bronze thrust washer 54', FIG. 8. The shaft 8 also has a key-way slot 56 formed therein for the placement of a conventional key 56' which prevents slippage of the shaft 8 when it is rotated within the valve operator assembly 26. Assembly 26 is actuated by a manual chain wheel 24 in conventional fashion. The bearing and packing assembly of the outlet shaft 10 is similar to that of the inlet shaft 8 except for the keying arrangement of the valve operator and, therefore, need not be repeated.

In order to ensure minimum leakage of hot gases in the area of the disc hubs 12 and 14, the outer circular edge portions of the hubs which surround the surfaces 50 have grooves 34 formed therein in a circular configuration as shown in FIGS. 6-8. The grooves 34 have a tapered cross-section to receive a strip of braided metal such an Inconel material therein, which is adapted to rotatably engage the end surface of a stationary keeper element 51 as shown in FIG. 8. The keeper element 51 retains the previously mentioned packing gland assembly 52 which supports the shaft 8. Thus, the resilient sealing element 32 carried by the disc, along with the resilient sealing element 34 carried by the hubs 12 and 14, provide a continuous, resilient high temperature seal around the entire periphery of the disc 4, including the hub regions, so as to virtually eliminate hot gas leakage therearound. The unique arrangement depicted in FIG. 8 comprising the resilient braided sealing element 34 and the Neoprene 0-ring seal 48 provides superior sealing both against hot gas leakage as well as cooling liquid leakage.

Figure 5:
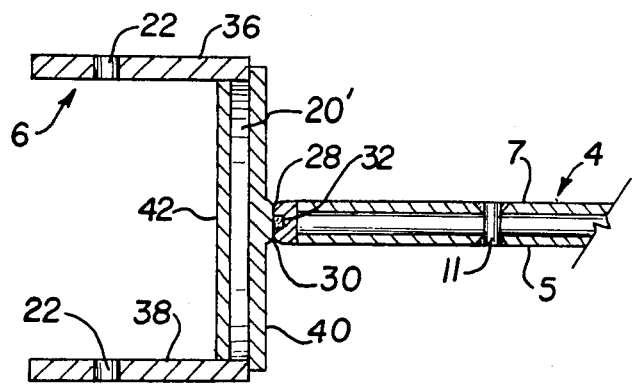
FIG. 5 is a partial, cross-sectional view of the disc and body at the sealing surfaces taken along line V—V of FIG. 1.

The body 6 of the butterfly valve is also provided with a pair of 180° extending fluid jackets 20 and 20' to provide for heat exchange in the area of the second valve sealing surface 30. The valve body 6 comprises a pair of spaced-apart first and second body plates 36 and 38, respectively. Each of the body plates have a centered aperture 35 formed therein. A ring-shaped inner sidewall plate 40 is attached, preferably by welding, to and around the apertures 35 on both of the body plates 36 and 38. A concentric, ring-shaped outer sidewall plate 42 is weldably secured to the body plates 36 and 38 and defines an annular cooling jacket 20 and 20' in the spaced area between the inner and outer sidewall plates 40 and 42, see FIGS. 5, 11 and 12. The cooled inner sidewall plate 42 preferably has a raised seat area 30 formed around its inner circumference which forms the second valve seating surface. Seat area 30 may be formed by a weld bead of a high abrasion resistant metal alloy material to prolong the life of the seal.

Figure 11:
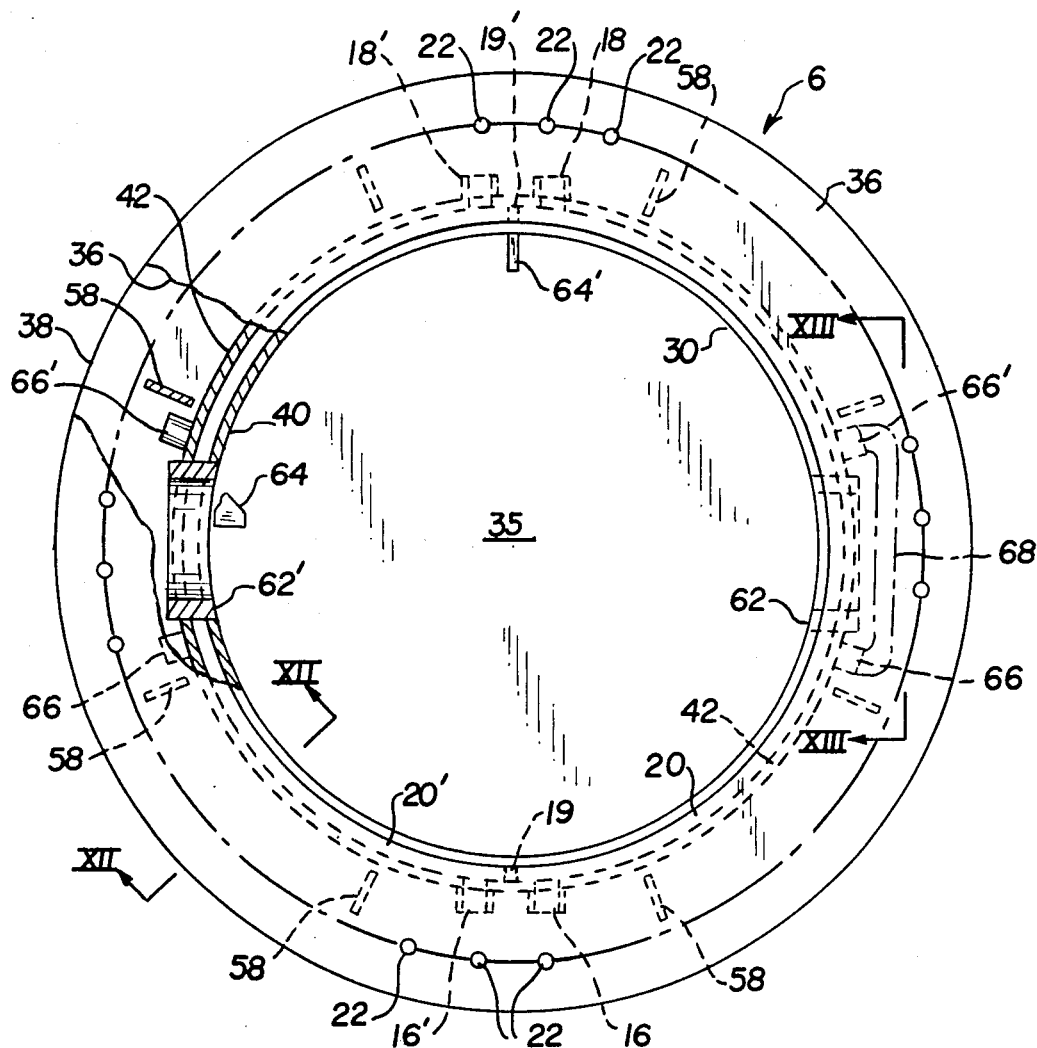
FIG. 11 is a front-elevational view of the valve body of the butterfly valve of FIG. 1.
Figure 12:
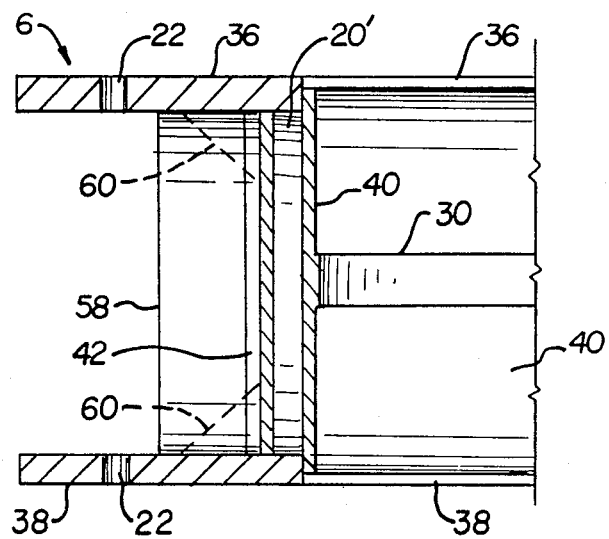
FIG. 12 is a partial, cross-sectional view taken along line XII—XII of FIG. 11.

As seen in FIG. 11, the aperture 35 of the valve body 6 occupies the central region of the body, and is adapted to align with the hot gas main, conduit or like duct or pipe. The circular array of bolt holes 22 carried by the body plates 36 and 38 are adapted to mate with like holes formed in the flanges of the main (not shown) and be boltably secured thereto. The valve body 6 further includes a plurality of spaced-apart stiffener webs 58 which extend between the first and second body plates 36 and 38 and are weldably secured thereto, FIGS. 11 and 12. Further structural stiffening is achieved through the use of diagonal gusset plates 60 which are positioned at the junctions of the first and second body plates 36 and 38 and the outer jacket sidewall 42, FIG. 12. The annular coolant jacket passageways 20 and 20' defined by the ring-shaped inner and outer sidewalls 40 and 42 provide a structurally strong, double-wall, reinforced structure which increases the overall strength of the valve body to a level usually exceeding that possessed by a conventional main pipeline. The valve body 6 generally requires no support braces, posts or like bracing of the type commonly required in prior art valves of this large size. Thus, structural rigidity of the valve body is increased through the provision of the double-walled coolant jacket in the body.

A pair of coolant inlet fittings 16 and 16' communicate with the water jacket passageways 20 and 20', respectively, to permit the introduction of a cooling fluid, preferably water, therein. A like pair of fluid outlet fittings 18 and 18' are diametrically opposed from the aforesaid inlet fittings to provide an outlet for the cooling fluid from the respective coolant jacket passageways 20 and 20'. A pair of diametrically opposed plugs 19 and 19' are fitted within the annular water jacket to split the fluid streams into distinct 180° segments to ensure a continuous and uniform flow of cooling water within the jackets 20 and 20', whereby a uniform heat exchange is achieved around the inner sidewall 40 and the second valve sealing surface 30 thereon.

A pair of small web-like plate elements 64 and 64' are attached to the inner sidewall plate 40 of the valve housing 6. The webs are spaced at a 90° relationship to act as stop elements for the disc 4. Hence, element 64' serves as a stop for the disc in the closed position, while element 64 prevents further rotative movement when the disc 4 has been rotated to a fully open position, which is 90° from the position shown in FIG. 1. In the open position, the plane of the disc 4 is parallel with a longitudinal axis of the main and the central orifice 35 of the valve member.

Figure 13:
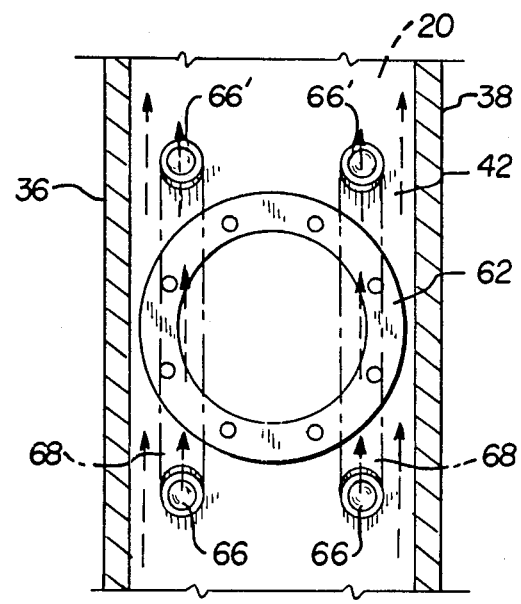
FIG. 13 is a partial, cross-sectional view taken along line XIII—XIII of FIG. 11.

The valve body 6 further includes a pair of diametrically opposed, cylindrically shaped bearing plates 62 and 62' which are adapted to receive the disc shafts 8 and 10, respectively, as well as the bearing assemblies 25 and 25' and related packing elements depicted in FIG. 8. With reference to FIGS. 11 and 13, and particularly to FIG. 13, it is noted that the volume within coolant jackets 20 and 20' becomes substantially diminished in the regions of the cylindrical bearing plates 62 and 62'. In order to ensure an uninterrupted flow of cooling fluid around the hub bearing plates 62 and 62', two sets of four bypass fittings 66 and 66, are provided on the outer sidewall plate 42. The bypass fittings have orifices communicating with the interior of the cooling jackets 20 and 20' on respective sides of the body 6. Coupling hoses 68 connect each of the pairs of bypass fittings 66 and 66' to permit the cooling fluid to flow around the restriction created by the bearing plates 62 and 62' to provide an adequate coolant flow to cool inner sidewall 40 and the second sealing surface 30 of the valve body 6. The bypass hoses 68 which may be a conventional MESA hose, butyl rubber, metallic or like hose, are connected to the fittings 66 and 66'. The hoses 68 need not be of a high temperature material since that portion of the body 6 remains approximately at ambient temperatures.

In operation, the fittings on inlet orifices 16 and 16' of the cooling jackets 20 and 20' are also preferably attached by conventional hoses or like conduits to the cooling water supply of the plant. Likewise, the outlet fittings 18 and 18' are attached by way of like hoses to the plant water cooling system. While it is preferred, from a reliability standpoint, to employ a separate water input to the disc cooling inlet at shaft 8 and a separate water input line to the body cooling inlets 16 and 16', it is also possible to employ a series cooling arrangement. In such a alternate arrangement, fresh cooling water is first introduced to the inlet shaft 8 of the disc 4 and then the cooling water discharged from the outlet shaft 10 is recycled directly to feed the inlet fittings 16 and 16' of the body cooling jackets 20 and 20'.

From the above description, it can be appreciated that the sealing interface between the disc 4 and the body 6, at first sealing surface 28 and the second sealing surface 30, is maintained in close alignment since both the disc and the body elements are subject to the cooling influences of continuously circulating water or like coolant fluid. Sealing efficiencies of upwards of 98% and higher are attainable with the valve of the present invention. The structural plate elements of the present valve are constructed of economical mild steel which may also be refractory lined in certain applications, if desired. The combination is suitable for use in temperatures of 1500° F. and upwards of 2000° F. without suffering any plastic deformation commonly found in prior art butterfly valves.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A butterfly valve for use in a high temperature fluid conduit, main or the like, comprising:
   a valve disc having a hollow interior with diametrically opposed coolant fluid inlet and outlet orifice means communicating therewith, said disc including baffle means positioned within the hollow interior defining a continuous, tortous coolant fluid passageway across the disc between said inlet and outlet orifice means, said disc also including an outer peripheral edge, a portion thereof defining a first valve sealing surface therearound;
   a valve body having a high temperature fluid flow passage therethrough adapted to be placed in communication with said conduit, main or the like, including means for mounting said disc therein to permit rotative movement of said disc between an open position to a closed position within the flow passage of said body, said body including an inner sidewall surrounding said high temperature fluid flow passage, a portion of said sidewall defining a second valve sealing surface therearound, adapted to engage the first valve sealing surface when the disc is in the closed position, said body including a fluid coolant passageway means adjacent said inner sidewall adapted to contain a flow of coolant fluid therearound to extract heat from said sidewall and said second valve sealing surface.

2. A butterfly valve according to claim 1 wherein the means for mounting the disc within the valve body includes a pair of hollow shafts, each attached to diametrically opposed edge portions of said disc, each of the shafts attached respectively to said inlet and outlet orifices of said disc and adapted to supply and withdraw coolant fluid to and from the disc and also to extract heat from said disc mounting means.

3. A butterfly valve according to claim 2 wherein the inlet and outlet orifice means of said disc each comprises a hub having a depressed, cup-shaped central surface having fluid flow passages therethrough, each passage communicating with a respective hollow shaft and with the interior of the disc; said hollow shafts each having a flanged portion attached to said cup-shaped surface of the hub, said flange carrying an O-ring to sealably engage said cup-shaped surface to prevent coolant fluid leakage between said hubs and shaft flanges; a resilient, high temperature sealing element carried by the outer peripheral edge of the disc, forming the first valve sealing surface and wherein said disc hubs each have a circular edge portion surrounding the cup-shaped central surface and each of said circular edge portions also carries a resilient, high temperature sealing element to each rotatably engage a stationary element of said mounting means; whereby said resilient sealing elements carried by said disc and said hub edges are adapted to substantially seal-off the flow of hot gases when the disc is in the closed position.

4. A butterfly valve according to claim 3 wherein the resilient high temperature sealing element is a braided Inconel material.

5. A butterfly valve according to claim 1 including a resilient high temperature sealing element carried by the outer peripheral edge of said disc, forming the first valve sealing surface.

6. A butterfly valve according to claim 5 wherein the resilient sealing element is a braided Inconel material.

7. A butterfly valve according to claim 1 wherein the disc comprises a pair of spaced-apart disc plates joined around respective outer edges by a peripheral edge plate, said baffle means comprising a plurality of metal strips attached along one edge thereof to a first of said disc plates, a majority of said baffle strips being arranged in a parallel, spaced-apart array across said disc plate and having first alternating strip ends abutting said peripheral edge plate and second alternating strip ends spaced from said peripheral edge plate, whereby a continuous coolant fluid passageway is defined by said baffle strips in a serpentine-like array across said disc.

8. A butterfly valve according to claim 7 wherein the baffle strips are attached at spaced intervals along one edge thereof to said first disc plate and fitted within the disc interior such that small gaps are present between the baffle edges and the first and second disc plates, said gaps adapted to permit a controlled amount of coolant fluid flow beneath said baffle strip edges to prevent the formation of localized hot spots on said disc plates.

9. A butterfly valve according to claim 8 wherein the baffle strips are constructed of stainless steel and the disc plates are constructed of mild steel.

10. A butterfly valve according to claim 7 wherein the disc includes a plurality of spaced-apart stay bolts attached to the pair of disc plates, extending within the hollow interior thereof.

11. A butterfly valve according to claim 1 wherein the valve body comprises first and second spaced-apart body plates each having an aligned central aperture therethrough and wherein said inner sidewall is ring-shaped and is attached to said first and second body plates at the respective central apertures thereof, said body fluid coolant passageway means comprising a ring-shaped, outer sidewall attached to said body plates and spaced from said inner sidewall to define an annular cooling jacket therebetween.

12. A butterfly valve according to claim 11 wherein the inner sidewall of the valve body has a raised seat area formed around an inside circumferential portion thereof forming said second valve sealing surface therearound.

13. A butterfly valve according to claim 12 wherein the raised seat area is formed to an abrasion resistant material.

14. A butterfly valve according to claim 12 wherein the first valve sealing surface on said disc is formed by a resilient strip of a braided Inconel material which is adapted to sealably engage said raised seat area of the body inner sidewall when the disc is in the closed position.

15. A butterfly valve according to claim 11 wherein said body fluid coolant passageway means includes a pair of diametrically opposed flow plugs positioned within the annular coolant jacket to define an independent pair of 180°, first and second cooling jackets, and further including diametrically opposed pairs of inlet and outlet orifices each communicating with a respective first and second 180° cooling jacket, adjacent said flow plugs.

16. A butterfly valve according to claim 15 wherein the valve body includes bearing plates passing through diametrically opposed portions of said first and second cooling jackets to support a portion of said disc mounting means therein, said body fluid coolant passageway means further including bypass conduit means at each bearing plate communicating with the cooling jacket on opposed sides of said bearing plates to permit an unrestricted flow of coolant fluid around said bearing plates.

* * * * *